United States Patent
Talarico et al.

(10) Patent No.: US 11,864,229 B2
(45) Date of Patent: Jan. 2, 2024

(54) CONTENTION WINDOW SIZE UPDATE FOR NR SYSTEMS OPERATING ON UNLICENSED BAND

(71) Applicant: Apple Inc., Cupertino, CA (US)

(72) Inventors: Salvatore Talarico, Sunnyvale, CA (US); Jeongho Jeon, San Jose, CA (US); Gang Xiong, Beaverton, OR (US); Yingyang Li, Beijing (CN); Carlos Aldana, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 382 days.

(21) Appl. No.: 17/257,716

(22) PCT Filed: Aug. 7, 2019

(86) PCT No.: PCT/US2019/045445
§ 371 (c)(1),
(2) Date: Jan. 4, 2021

(87) PCT Pub. No.: WO2020/033505
PCT Pub. Date: Feb. 13, 2020

(65) Prior Publication Data
US 2021/0298075 A1 Sep. 23, 2021

Related U.S. Application Data

(60) Provisional application No. 62/715,580, filed on Aug. 7, 2018, provisional application No. 62/716,848, filed (Continued)

(51) Int. Cl.
*H04W 74/08* (2009.01)
*H04W 16/14* (2009.01)
(Continued)

(52) U.S. Cl.
CPC ....... *H04W 74/0808* (2013.01); *H04L 1/1812* (2013.01); *H04W 16/14* (2013.01); *H04W 72/23* (2023.01)

(58) Field of Classification Search
CPC ... H04W 28/04; H04W 72/04; H04W 72/042; H04W 88/08; H04W 74/0808;
(Continued)

(56) References Cited

U.S. PATENT DOCUMENTS 9,294,959 B2 * 3/2016 Seyama ................ H04L 1/1854
2013/0294357 A1 * 11/2013 Shimanuki ........ H04W 72/0466
370/329

(Continued)

FOREIGN PATENT DOCUMENTS

KR WO 2019/216619 A1 * 11/2019 ............ H04W 74/00
TW 3 606 243 A1 * 7/2019 ............ H04W 72/04
(Continued)

OTHER PUBLICATIONS

3GPP TSG RAN WG1 Meeting #92, Athens, Greece, Feb. 26-Mar. 2, 2018, R1-1801737, Source: CATT, Title: Open issues on CBG-based (re)transmission, Agent Item: 7.1.3.3.3. (Year: 2018).*
(Continued)

*Primary Examiner* — Peter G Solinsky
*Assistant Examiner* — Sanjay K Dewan
(74) *Attorney, Agent, or Firm* — Kowert, Hood, Munyon, Rankin & Goetzel, P.C.

(57) ABSTRACT

Systems and methods of adjusting contention window size (CWS) in a LBT procedure for both UL and DL unlicensed spectrum transmissions are described. The UE makes a HARQ-ACK determination for at least one code block group (CBG) of a transport block (TB) in a reference burst from a base station, determines whether the HARQ-ACK determination for the CBG meets a predetermined number
(Continued)

of NACKs, transmits to the base station a single bit HARQ-ACK feedback for the TB that is dependent on whether the predetermined number of NACKs has been met, and receives or determines the adjusted CWS and uses the adjusted CWS for communication with the base station.

20 Claims, 6 Drawing Sheets

Related U.S. Application Data on Aug. 9, 2018, provisional application No. 62/790,376, filed on Jan. 9, 2019, provisional application No. 62/804,107, filed on Feb. 11, 2019, provisional application No. 62/821,847, filed on Mar. 21, 2019.

(51) Int. Cl.
*H04W 72/04* (2023.01)
*H04L 1/18* (2023.01)
*H04L 1/1812* (2023.01)
*H04W 72/23* (2023.01)

(58) Field of Classification Search
CPC .... H04W 16/14; H04W 72/23; H04L 5/0007; H04L 1/1812
USPC .......................................................... 370/329
See application file for complete search history.

(56) References Cited

U.S. PATENT DOCUMENTS

| | | | | |
|---|---|---|---|---|
| 2017/0273056 A1* | 9/2017 | Papasakellariou | .... | H04L 1/1861 |
| 2018/0139779 A1* | 5/2018 | Kim | .......................... | H04L 1/18 |
| 2019/0149275 A1* | 5/2019 | He | ...................... | H04L 65/1016 |
| | | | | 370/329 |
| 2019/0327752 A1* | 10/2019 | Kim | ....................... | H04W 16/14 |
| 2020/0396767 A1* | 12/2020 | Talarico | ............ | H04W 74/0808 |
| 2021/0044401 A1* | 2/2021 | Yoon | ....................... | H04B 7/088 |
| 2022/0085924 A1* | 3/2022 | Talarico | ................ | H04L 1/1854 |
| 2022/0167398 A1* | 5/2022 | Myung | ............. | H04L 27/26025 |

FOREIGN PATENT DOCUMENTS

| | | | | | |
|---|---|---|---|---|---|
| WO | WO 2017/147515 A1 | * | 8/2017 | ............... | H04L 1/18 |
| WO | WO 2020/033505 A1 | * | 2/2020 | ............ | H04W 74/00 |
| WO | WO 2021/118743 A1 | * | 6/2021 | ............ | H04W 74/08 |

OTHER PUBLICATIONS

3GPP TSG RAN WG1 Meeting #92, Athens, Greece, Feb. 26-Mar. 2, 2018, R1-1802912, Agenda Item: 7.1.3.3.3, Source: Ericsson, Title: Remaining issues for CBG based HARQ. (Year: 2018).*
3GPP TSG RAN WG1 Meeting #92, Athens, Greece, Feb. 26-Mar. 2, 2018, R1-1801344, Agenda Item: 7.1.3.3.3, Source: Huawei, HiSilicon, Title: Remaining issues on CBG-based (re)transmission. (Year: 2018).*
CATT, "Open issues on CBG-based (re)transmission", R1-1801737, 3GPP TSG RAN WG1 Meeting #92, Athens, Greece, Feb. 17, 2018, pp. 1-2.
Ericsson, "Remaining issues for CGB based HARQ", R1-1802912, 3GPP TSG RAN WG1 Meeting #92, Athens, Greece, Feb. 17, 2018, pp. 1-3.
Huawei, Hisilicon, "Remaining issues on CBG-based (re)transmission", R1-1801344, 3GPP TSG RAN WG1 Meeeting #92, Athens, Greece, Feb. 17, 2018, pp. 1-2.
International Search Report and Written Opinion of International Application No. PCT/US2019/045445, dated Nov. 25, 2019, pp. 1-9.

* cited by examiner

CONTENTION WINDOW SIZE UPDATE FOR NR SYSTEMS OPERATING ON UNLICENSED BAND

This application claims the benefit of priority to U.S. Provisional Patent Application Ser. No. 62/715,580, filed, Aug. 7, 2018, U.S. Provisional Patent Application Ser. No. 62/716,848, filed, Aug. 9, 2018, U.S. Provisional Patent Application Ser. No. 62/790,376, filed, Jan. 9, 2019, U.S. Provisional Patent Application Ser. No. 62/804,107, filed, Feb. 11, 2019, and U.S. Provisional Patent Application Ser. No. 62/821,847 filed Mar. 21, 2019, each of which is incorporated herein by reference in its entirety.

TECHNICAL FIELD

Embodiments pertain to radio access networks (RANs). Some embodiments relate to cellular networks, including Third Generation Partnership Project (3GPP) Long Term Evolution (LTE), $4^{th}$ generation (4G) and 5th generation (5G) New Radio (NR) (or next generation (NG)) networks. Some embodiments relate to unlicensed band use in Licensed Assisted Access (LAA) systems.

BACKGROUND

The use of various types of systems has increased due to both an increase in the number and types of user equipment (UEs) using network resources as well as the amount of data and bandwidth being used by various applications, such as video streaming, operating on these UEs. Bandwidth, latency, and data rate enhancement may be used to deliver the continuously-increasing demand for network resources. In particular, one method of meeting the demand is to increase use of the unlicensed band by cellular devices and systems.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
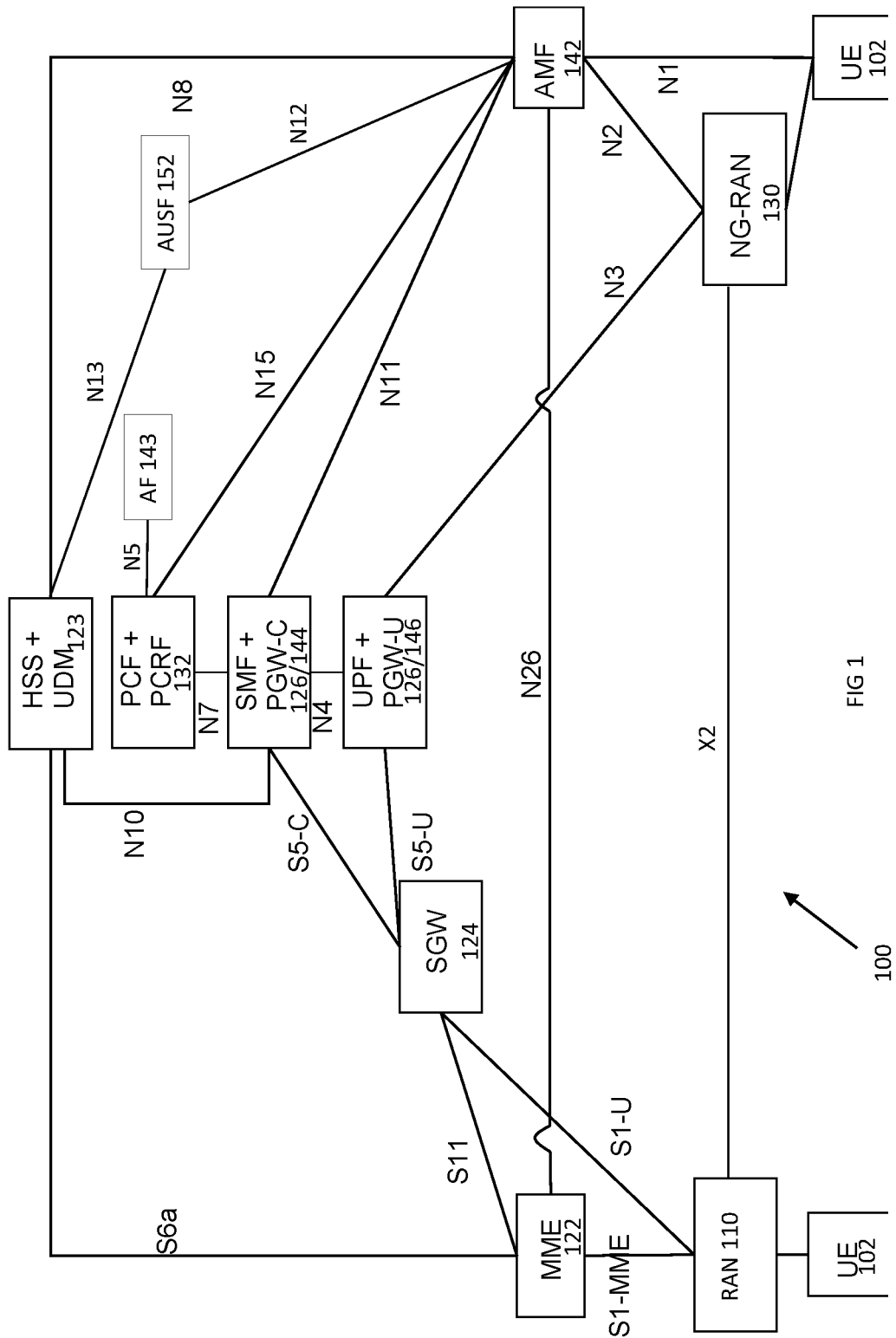
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or random access network (RAN) 110 and/or may be connected to the NG-RAN 130 (gNB) or an Access and Mobility Function (AMF) 142. The RAN 110 may be an eNB or a general non-3GPP access point, such as that for Wi-Fi. The NG core network may contain multiple network functions besides the AMF 112. The UE 102 may generate, encode and perhaps encrypt uplink transmissions to, and decode (and decrypt) downlink transmissions from, the RAN 110 and/or gNB 130 (with the reverse being true by the RAN 110/gNB 130).

The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 146 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an Sha interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
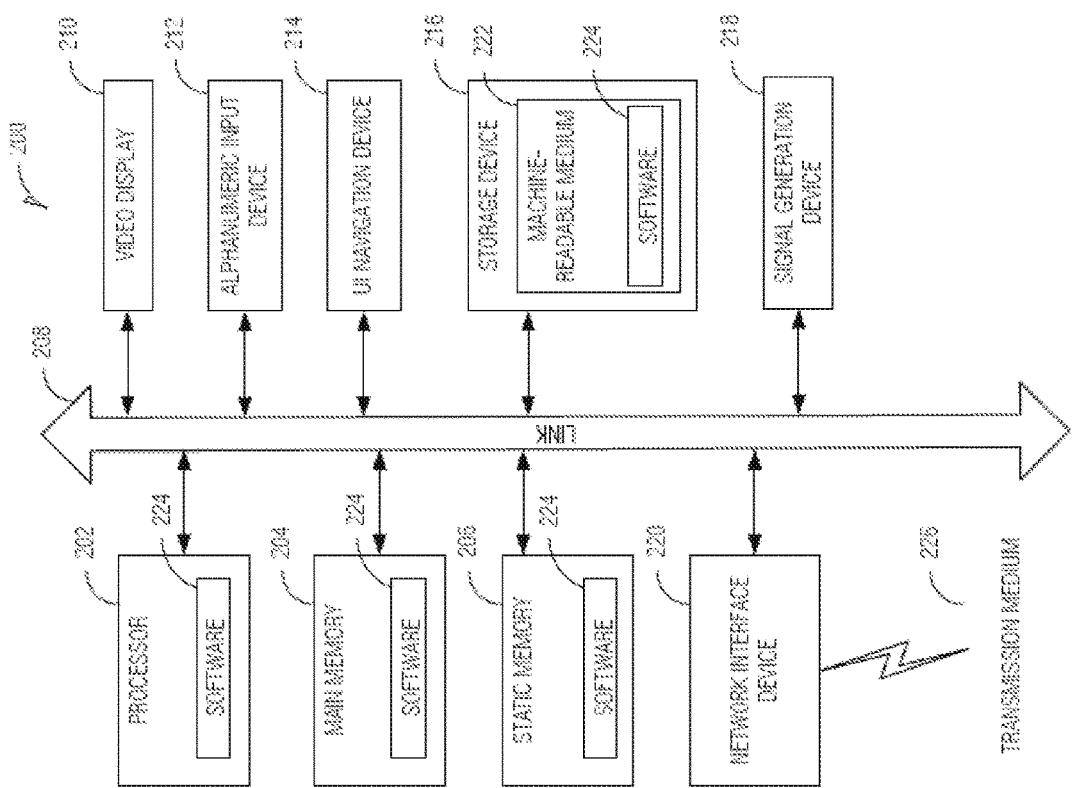
FIG. 2 illustrates a block diagram of a communication device in accordance with some embodiments.

FIG. 2 illustrates a block diagram of a communication device in accordance with some embodiments. In some embodiments, the communication device may be a UE (including an IoT device and NB-IoT device), eNB, gNB or other equipment used in the network environment. For example, the communication device 200 may be a specialized computer, a personal or laptop computer (PC), a tablet PC, a mobile telephone, a smart phone, a network router, switch or bridge, or any machine capable of executing instructions (sequential or otherwise) that specify actions to be taken by that machine. In some embodiments, the communication device 200 may be embedded within other, non-communication based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

The communication device 200 may be an IoT device (also referred to as a "Machine-Type Communication device" or "MTC device"), a narrowband IoT (NB-IoT) device, or a non-IoT device, any which may communicate with the core network via the eNB or gNB shown in FIG. 1. The communication device 200 may be an autonomous or semiautonomous device that performs one or more functions, such as sensing or control, among others, in communication with other communication devices and a wider network, such as the Internet. If the communication device 200 is IoT device, in some embodiments, the communication device 200 may be limited in memory, size, or functionality, allowing larger numbers to be deployed for a similar cost to smaller numbers of larger devices. The communication device 200 may, in some embodiments, be a virtual device, such as an application on a smart phone or other computing device.

As above, spectrum availability is increasingly reduced with the explosion in UEs. To mitigate this, use of the unlicensed spectrum has been an area of interest to expand the availability of LTE and 4G and 5G resources. UEs, including Release (Rel)-13 eMTC and NB-IoT UEs, may operate in licensed spectrum, but may experience a decrease in data rate due to the scarcity of licensed spectrum in low frequency band. Thus, there are emerging interests in the operation of LTE systems in unlicensed spectrum. LTE operation in unlicensed spectrum includes Carrier Aggregation (CA) based on Licensed Assisted Access (LAA)/enhanced LAA (eLAA) systems, LTE operation in the unlicensed spectrum via dual connectivity (DC), and a standalone LTE system in the unlicensed spectrum.

To introduce shared/unlicensed spectrum in 5G NR various features of NR-based operation in unlicensed spectrum may be studied, including physical channels inheriting the choices of duplex mode, waveform, carrier bandwidth, subcarrier spacing, frame structure, and physical layer design made as part of the NR study and avoiding undesired divergence. Unlicensed bands both below and above 6 GHz, up to 52.6 GHz are being studied, as are unlicensed bands above 52.6 GHz to the extent that waveform design principles remain unchanged with respect to below 52.6 GHz bands. Forward compatibility principles may be considered as well.

Other studies may include initial access, channel access, scheduling/HARQ, and mobility including connected/inactive/idle mode operation and radio-link monitoring/failure. Moreover, coexistence methods may be studied within NR-based and between NR-based operation in the unlicensed and LTE-based LAA and with other incumbent RATs in accordance with regulatory requirements in e.g., 5 GHz, 37 GHz, 60 GHz bands. To this end, coexistence methods already defined for the 5 GHz band in LTE-based LAA context should be assumed as the baseline for 5 GHz operation. Enhancements in 5 GHz over these methods may not be precluded. NR-based operation in the unlicensed spectrum may not impact deployed Wi-Fi services (data, video and voice services) more than an additional Wi-Fi network on the same carrier.

Accordingly, identification of aspects of the design that can be enhanced for NR when operating in unlicensed spectrum may be desirable. One of the challenges in this case is for this system to maintain fair coexistence with other incumbent technologies, which may depend on the particular band in which the UE might operate other network and band restrictions may be taken into account when designing the system. For instance, if operating in the 5 GHz band, a listen-before-talk (LBT) procedure may be performed in some parts of the world to acquire the medium before a transmission can occur.

Rel. 15 NR introduces the concept of code block groups (CBGs), wherein essentially a transport block (TB) is divided into smaller subsets, called CBGs. These groups are decoded by the UE, and the UE then sends Hybrid Automatic Repeat Request (HARQ) feedback for each CBG. The CBG-based retransmission may cope with the fact that NR supports very large transport block sizes (TBS) and, as in legacy LTE, the scheduler works with 10% Block Error Rate (BLER) target. This implies that if the gNB is transmitting data to the UE with a large TBS, around 10% of the data may be subject to retransmission. However, if the TB is divided into smaller subsets, the UE may send a negative acknowledgment (NACK) for only the failed subsets and the gNB may only retransmit the failed subsets instead of the whole TB. This can effectively reduce the overhead of retransmission, and improve spectral efficiency, even though the HARQ feedback overhead may be increased, since the UE may no longer transmit a single bit per TB, but may instead send multiple bits for each TB based on the number of CBGs. In order to reduce this overhead, the CBG-based (re)transmission procedure may be configurable. In fact, a UE may be semi-statically configured by radio resource control (RRC) signaling to enable CBG-based retransmission, and the maximum number of CBGs per TB can be configured by RRC to be 2n, where n=1-4 (i.e., {2,4,6,8}). By changing the number of CBGs per TB, the number of code block (CB) per CBG also changes according to the TBS. In Rel. 15 NR, the CBG-based (re)-transmission is allowed only for the TB of a HARQ process. The CBG-based (re)transmission procedure is also separately configurable for UL and DL.

As above, when operating the NR system on an unlicensed spectrum, before initiating any transmission the LBT procedure may be performed. In Rel-13 and Rel-14, the LBT priority classes, LBT parameters, and maximum channel occupancy time (MCOT) values provided in Table I for downlink (DL) and Table II for uplink (UL) were agreed.

TABLE I

LBT parameters and MCOT values for DL

| LBT Priority Class | n | CWmin | CWmax | MCOT | Set of CW sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Channel Access Priority Class (p)

TABLE II

LBT parameters and MCOT values for UL

| LBT priority class | n | CWmin | CWmax | MCOT | Set of CW sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms (see note 1) or 10 ms (see note 2) | {15, 31, 63, 127, 255, 511, 1023} |
| 4 | 7 | 15 | 1023 | 6 ms (see note 1) or 10 ms (see note 2) | {15, 31, 63, 127, 255, 511, 1023} |

NOTE 1:
The MCOT of 6 ms may be increased to 8 ms by inserting one or more gaps. The minimum duration of a pause shall be 100 μs. The maximum duration (Channel Occupancy) before including any such gap shall be 6 ms. The gap duration is not included in the channel occupancy time.
NOTE 2:
If the absence of any other technology sharing the carrier can be guaranteed on a long term basis (e.g. by level of regulation), the maximum channel occupancy time (MCOT) for LBT priority classes 3 and 4 is for 10 ms, otherwise, the MCOT for LBT priority classes 3 and 4 is 6 ms as in note 1.

In legacy LAA, the contention windows size (CWS) is adapted based on the HARQ-ACK feedback.

For DL: Given a reference subframe set (which is the first DL subframe of the latest DL data burst for which HARQ-ACK feedback is available) the CWS is increased if at least 80% of the HARQ-ACK feedback values for a reference subframe are NACK. Otherwise, the CWS is reset to the minimum value.

For UL: Given a reference subframe (which is the first subframe with an Uplink Shared Channel (UL-SCH) that was transmitted at least 4 ms prior to the UL grant reception in the most recent transmitted burst of contiguous subframes that is transmitted after performing a category 4 LBT procedure) and the HARQ_ID_ref, which is the HARQ ID of the reference subframe, the CWS of all priority classes at the UE is reset for all the priority classes if an UL grant is received and the New Data Indicator (NDI) bit for at least one of the active HARQ processes (i.e., the TB is not disabled) of the HARQ_ID_ref is toggled. Otherwise (i.e., the HARQ_ID_ref is not scheduled or the NDI of the active HARQ process(es) of the HARQ_ID_ref is not toggled) the contention window size of all priority classes at the UE is increased to the next higher value. Furthermore, the CWS is reset to the minimum value if the maximum CWS is used for K consecutive LBT attempts for transmission only for the priority class for which maximum CWS is used for K consecutive LBT attempts, where K is selected by UE implementation from the set of values from (1, . . . , 8).

As above, when operating the NR system on an unlicensed spectrum (NR-U), before initiating any transmission, the LBT procedure may be performed, and its CWS should be adjusted based on the HARQ-ACK feedback. During LAA, a CWS adjustment procedure may allow fair coexistence with incumbent technologies. For NR-U a similar intention may be maintained when designing the corresponding CWS adjustment procedure. While the Rel-14 LBT priority classes, LBT parameters, and MCOT values, summarized in Table I, may be reused as for NR-U, the same may not apply for the LTE LAA Rel-14 CWS adjustment procedure, for which modifications may be made to cope with the CBG-based retransmission procedure introduced in Rel-15 for NR.

Sets for CWS Adjustment

In some embodiments, the parameters from Table I and Table II may be reused for NR. In some embodiments, the LBT parameters and MCOT values for Table II are as in Table III to align NR-U toward Wi-Fi and allow the two technologies to be in par. In particular, note that for Table III as an example aCWmax=1023.

TABLE III

LBT parameters and MCOT values for UL in terms of aCWmax

| LBT priority class | n | CWmin | CWmax | MCOT | Set of CW sizes |
|---|---|---|---|---|---|
| 1 | 2 | ((aCWmax + 1)/ 256 − 1) | ((aCWmax + 1)/ 128 − 1) | 2 ms | {3, 7} |
| 2 | 2 | ((aCWmax + 1)/ 128 − 1) | ((aCWmax + 1)/ 64 − 1) | 4 ms | {7, 15} |
| 3 | 3 | ((aCWmax + 1)/ 64 − 1) | aCWmax | 6 ms (see note 1) or 10 ms (see note 2) | {15, 31, 63, 127, 255, 511, 1023} |
| 4 | 7 | ((aCWmax + 1)/ 64 − 1) | aCWmax | 6 ms (see note 1) or 10 ms (see note 2) | {15, 31, 63, 127, 255, 511, 1023} |

NOTE 1:
The MCOT of 6 ms may be increased to 8 ms by inserting one or more gaps. The minimum duration of a pause shall be 100 μs. The maximum duration (Channel Occupancy) before including any such gap shall be 6 ms. The gap duration is not included in the channel occupancy time.
NOTE 2:
If the absence of any other technology sharing the carrier can be guaranteed on a long term basis (e.g. by level of regulation), the maximum channel occupancy time (MCOT) for LBT priority classes 3 and 4 is for 10 ms, otherwise, the MCOT for LBT priority classes 3 and 4 is 6 ms as in note 1.

CWS Adjustment in NR-U for DL

In Rel.13, the CWS may be increased to the next higher value if at least 80% of the HARQ-ACK feedback values for a reference subframe set are NACK. Otherwise, the CWS may be reset to the minimum value. As in NR, a CBG-based (re)-transmission is introduced, therefore the CWS adjustment procedure defined for LAA may be modified to clarify how the feedback for each CBG is counted toward X % of the HARQ-ACK feedbacks, where X is in one example 80.

Figure 3A:
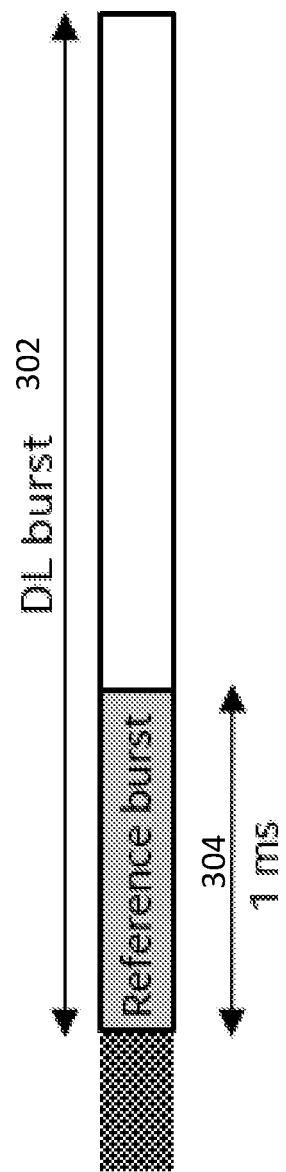
FIG. 3A illustrates an example of a downlink burst in accordance with some embodiments.

FIG. 3A illustrates an example of a downlink burst in accordance with some embodiments. As shown, the DL burst 302 may contain a reference DL burst 304. In one embodiment, the DL burst 302 may be defined for the CWS adjustment as follows: the reference burst 304 may always be 1 ms long, independently from the subcarrier spacing. The reference burst 304 may also start from the beginning of the DL burst 302, as illustrated in FIG. 3A.

Figure 3B:
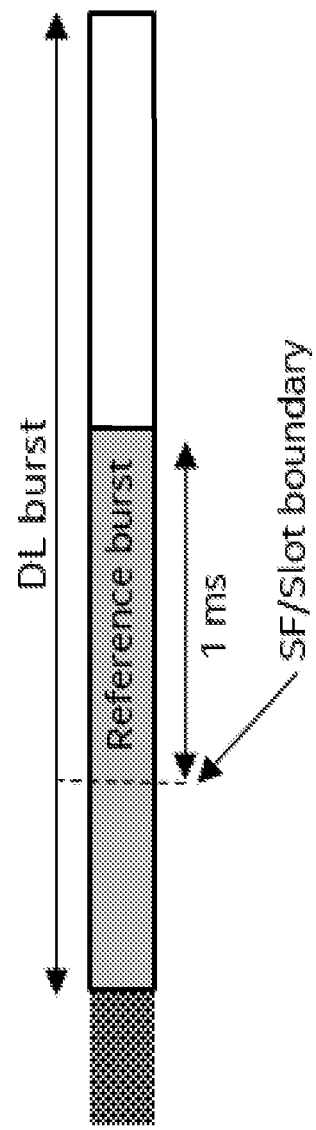
FIG. 3B illustrates an example of a downlink reference burst in accordance with some embodiments

FIG. 3B illustrates an example of a downlink reference burst in accordance with some embodiments. As shown, the reference burst 304 may be composed of a partial subframe (SF) or a slot from the beginning of the DL burst 302+the following SF or slot independent of the subcarrier spacing. If a partial subframe is the only subframe included in the reference DL burst 304, only the partial subframe is used for CWS adjustment.

The reference burst 304 may be composed of N symbols (e.g., 14) from the start of the DL burst 302. N may be configured by RRC signaling and may be larger than the number of symbols in the partial slot. The reference burst 304 may be instead composed of the partial slot only. The reference burst 304 may be composed of Tms, or μs, starting from the beginning of the DL burst 302, where T, for example, is 1 ms.

In one embodiment, when the CBG-based transmission is configured, the NACKs may be counted such that if a NACK is received for at least one of the CBGs for a specific TB, the feedback from all other CBGs for that TB within the reference slot set are also counted as a NACK. In another embodiment, when the CBG-based transmission is configured, each feedback may be counted individually for each CBG within a TB as either a NACK or an ACK independently of the value of the other CBG feedback for that TB.

In one embodiment, the ACK/NACK is counted per TB, which may use a representation of ACK/NACK for each TB with CBG-based HARQ ACK feedback. In this case, in various embodiments, a TB can be counted as NACK, if 1) all the CBGs comprising the TB are NACK'ed, 2) at least one CBG is NACK'ed, or 3) X % of CBGs are NACK'ed.

In one embodiment, when CBG-based transmission is configured, the NACK may be counted on a per TB basis, meaning that all the CBGs per TB are bundled into one bit. In this case, if the gNB doesn't schedule all unsuccessful CBG of a TB, 2 choices may exist: either the TB may be considered as a NACK even though all scheduled CBG are correctly received, or the TB may not be counted for CWS adjustment in this case. Alternatively, only the currently scheduled CBGs may be considered to derive bundled HARQ-ACK for CWS adjustment. In various embodiments, a TB can be counted as NACK, if 1) all the currently scheduled CBGs of the TB are NACK'ed, 2) at least one of the currently scheduled CBG is NACK'ed, or 3) X % of currently scheduled CBGs are NACK'ed.

Since some UEs may be configured with CBG-based transmission while others would perform TB based transmission, the percentage of NACKs Z may be evaluated through one of the following ways:

$$Z=(c*NACK_{CBG}+t*NACK_{TB})/(c*N_{CBG}+t*N_{TB}) \quad (1)$$

$$Z=(u*NACK_{CBG}+(1-u)*NACK_{TB})/(u*N_{CBG}+(1-u)*N_{TB}) \quad (2)$$

where $NACK_{CBG}$ is the number of NACKs per CBG in the reference DL burst, $NACK_{TB}$ is the number of NACKs per TB in the reference DL burst, $N_{CBG}$ is the total number of CBGs feedbacks in the DL reference burst, $N_{TB}$ is the total number of TBs feedbacks in the DL reference burst. In one embodiment, if eqn. (1) is used, then "c" and "t" are two variables, where for example $0 \leq c \leq 1$ and $0 \leq t \leq 1$. Note that the variables "c" and "t" may be defined as a function of maximum number of CBG within a slot for UEs or 8. In another option, these two values may depend on the number of TB and/or CBG transmissions scheduled in the window or DL burst.

In one embodiment, the value of c and/or t may be RRC configurable or depend on the configuration. In one embodiment, if eqn. (2) is used, "u" is a variable such that $0 \leq u \leq 1$. As above, the value of u may be RRC configurable or may depend on the configuration.

In one embodiment, the TBs/CBGs/CBs feedback for one or more of the following cases are not used for the CWS adjustment: a TB/CBG/CB that is punctured by others e.g., Ultra-reliable low-latency communication (URLLC); in the initial partial slot, the TB/CBG/CB punctured due to late channel occupation; due to bandwidth part (BWP) switching, the UE doesn't report the HARQ-ACK for a particular physical downlink shared channel (PDSCH). In this case, the transmission may be considered a NACK as default or may be ignored for the CWS adjustment; or if the gNB doesn't schedule all unsuccessful CBG of a TB, such a TB may not be counted.

Self-scheduling discontinuous transmission (DTX) in some cases may be considered as an indication of collision and as a NACK in the matter of the CWS adjustment mechanism. In some embodiments, for cross-carrier scheduling, DTX may be ignored for the matter of the CWS adjustment mechanism. In other embodiments, for cross-carrier scheduling, DTX may be considered as an indication of collision and as a NACK in the matter of the CWS adjustment for the scheduling cell. In some embodiments, DTX may be considered as an indication of collision and as a NACK in the matter of the CWS adjustment in case that the related physical downlink control channel (PDCCH) is transmitted in a DL burst followed by CAT-4 LBT. In some embodiments, DTX may be considered as an indication of collision and as a NACK in the matter of the CWS adjustment in case that the related PDCCH is transmitted in the reference burst within a DL burst followed by CAT-4 LBT.

In some embodiments, similar to legacy LTE LAA, based on how scheduling is performed (e.g., self-scheduling or cross-carrier scheduling) the manner in which the 'DTX' feedback would be interpreted toward the CWS adjustment may be different. In particular, if the PDCCH is transmitted in a separate channel, 'DTX' may be ignored, and when PUCCH is transmitted in the same channel, the PUCCH transmission may be an indication that a collision may have occurred. Thus, 'DTX' may be treated as a NACK.

Another aspect to be considered is the CWS update for the gNB when the acquired COT is shared with grant-free or scheduled UEs, or when PDSCH transmission is not performed by the gNB. If the gNB performs PDSCH transmissions, and part of the acquired MCOT is configured for UL transmissions with overlapping time-domain resources for scheduled or grant-free transmissions, the CWS update may be performed as described above.

If the gNB does not perform any PDSCH transmissions, and part of the acquired MCOT is configured for UL transmissions with overlapping time-domain resources: in one embodiment if the eNB schedules UL TBs with a 25 µs LBT in a shared COT without any PDSCH, the gNB may increase the CWS if less than X % of the scheduled UL TBs are not successfully received or if less than X % of the CBGs for the scheduled UL are not successfully received. In some examples, X may be 10, or in case Q*100 is less than X, Q may be given by one of the following equations:

$$Q=(c*NACK_{CBG}+t*NACK_{TB})/(c*N_{CBG}+t*N_{TB}), \quad (3)$$

$$Q=(u*NACK_{CBG}+(1-u)*NACK_{TB})/(u*N_{CBG}+(1-u)*Nm), \quad (4)$$

where $NACK_{CBG}$ is the number of NACKs per scheduled UL CBG in the reference DL burst, $NACK_{TB}$ is the number of NACKs per UL scheduled TB in the reference DL burst, $N_{CBG}$ is the total number of scheduled UL CBGs feedback in the DL reference burst, and $N_{TB}$ is the total number of UL scheduled TBs feedback in the DL reference burst.

In some embodiments, if eqn. (3) is used "c" and "t" may be two variables. In another option, the "c" and "t" values may depend on the number of TB and/or CBG transmissions scheduled in the shared COT.

In some embodiments, the value of c and/or t may be RRC configurable or depend on the configuration. In one embodiment, if eqn. (4) is used, "u" may be a variable such that $0 \leq u \leq 1$. In one embodiment, the value of u may be RRC configurable or depend on the configuration.

In some embodiments, if the gNB schedules UL TBs with a 25 µs LBT in a shared COT without any PDSCH, and also shares the MCOT with grant-free UEs, the CWS update may be performed based on the schedule and/or grant-free TBs or CBGs that have been detected by the gNB.

CWS Adjustment in NR-U for UL

In some embodiments, for a Cat. 4 LBT for UL transmission, the CWS may be adjusted per UE and at the UE. In this case, a reference UL burst may be defined for the CWS adjustment as follows: the reference burst may be always 1 ms long independent of the subcarrier spacing and start from the beginning of the UL burst; the reference burst may be composed by the partial SF from the beginning of the UL burst+following SF independent of the subcarrier spacing—if the partial subframe is the only subframe included in the reference UL burst, only the partial subframe may be used for CWS adjustment; the reference burst may be composed by N symbols from the start of the UL burst, where N is RRC configured, and N may be larger than the number of symbols that compose the initial partial slot; the reference burst may be composed by the initial partial slot only; or the reference burst may be composed by T ms starting from the beginning of the UL burst, where T is, for example, 1 ms.

In some embodiments, the gNB may configure a number of symbols N, so that the reference burst occurs at least in symbol ns-N, where ns is the first or last symbol of the Control-resource set (CORESET) containing the UL grant or a Downlink Feedback Indication (DFI) downlink control information (DCI). In some embodiments, the number of symbols N may be evaluated as:

$$N=N_x+y, \quad (5)$$

where $N_x$ is the processing delay based on the gNB capability for PUSCH decoding (which depends on the subcarrier spacing), and y is a margin to give gNB freedom for scheduling. For example, $N_x$ may be about 4 ms, although this number may vary as above.

In other embodiments, the number of symbols N may evaluated as:

$$N=N_x+TA+y, \quad (6)$$

where $N_x$ is the processing delay based on the gNB capability for PUSCH decoding (which depends on the subcarrier spacing), and y is a margin to give gNB freedom for scheduling, and TA is the time advance of the UE.

Figure 4:
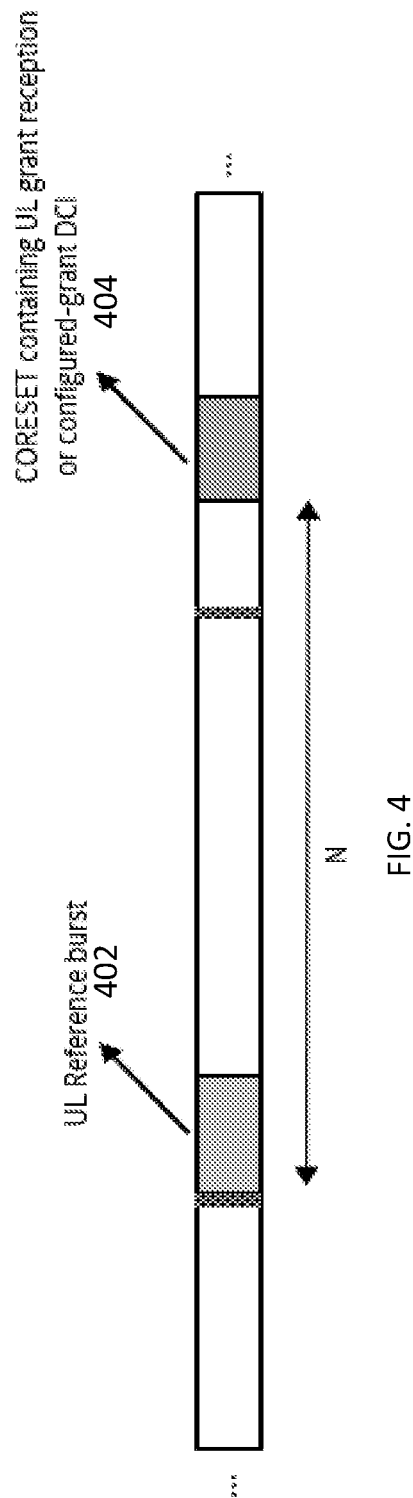
FIG. 4 illustrates timing between an uplink reference burst and CORESET in accordance with some embodiments.

In some embodiments, similar to legacy LTE-LAA, the gNB may configure a number of slots N, so that the reference burst occurs before ns-N, where here ns is the slot containing the UL grant or the DFI DCI. FIG. 4 illustrates timing between an uplink reference burst and CORESET in accordance with some embodiments. As shown, the reference burst 402 occurs ns-N slots before the UL grant or the DFI DCI 404.

In some embodiments, N may be provided in symbols, slots, subframes, radio frames, or in terms of time (e.g., ms). In some embodiments, the value of N may be counted from the beginning or the end of the UL reference burst until the start or the end of the CORESET containing the related UL grant reception or configured grant DCI. In some embodiments, N may be counted from the start of the first uplink symbol of the reference burst, until the last symbol of the PDCCH with the CORESET containing the related UL grant reception or configured grant DCI; in other embodiments, N may be counted from the end of the last slot of the reference burst, until the first or last slot of the PDCCH with the CORESET containing the related UL grant reception or configured grant DCI.

In some embodiments, the HARQ_ID_ref may be defined as the HARQ process ID of the reference burst. In some embodiments, for scheduled UEs if the NDI bit for at least one of the active HARQ processes of HARQ_ID_ref in the reference burst is toggled, the contention window size at the UE may be reset for all the priority classes. In some embodiments, if the HARQ_ID_ref is not scheduled or NDI of the active HARQ process(es) of HARQ_ID_ref is not toggled, the contention window size of all priority classes at the UE may be increased to the next higher value.

In some embodiments, if CBG-based transmission is configured, the individual bits of the CBG Transmit Information (CBGTI)=1 may be considered as failure when the NDI is not toggled (i.e., retransmission) for the same HARQ process, i.e., NACK; otherwise the CBGTI may be considered as successful, i.e. ACK. In some embodiments, the CBGs may be bundled to represent the information on TB failure/success in the CWS adjustment mechanism.

In some embodiments, if CBG-based transmission is configured, all CBGs of a TB transmitted in the reference burst may be considered in the CWS adjustment. In some embodiments, if CBG-based transmission is configured, only the currently transmitted CBGs of a TB transmitted in the reference burst may be considered for the CWS adjustment.

In some embodiments, when the CBG-base transmission is configured, the NACK may be counted such that if a NACK is received for at least one of the CBG for a specific TB, all other CBG feedbacks for that TB within the reference burst set are also counted as NACK. In another embodiment, when the CBG-based transmission is configured, each feedback may be counted individually for each CBG within a TB as either a NACK or an ACK independent of the value of the other CBG feedback for that TB. In some embodiments, the ACK/NACK may be counted per TB, which uses a representation of the ACK/NACK for each TB with CBG-based HARQ ACK feedback. In this case, in some embodiments, a TB can be counted as a NACK, if 1) all the CBGs comprising the TB are NACK'ed, 2) at least one CBG is NACK'ed, or 3) X % of CBGs are NACK'ed.

In some embodiments, the percentage of NACKs X may be evaluated through one of the following equations:

$$X=(c^*NACK_{CBG}+t^*NACK_{TB})/(c^*N_{CBG}+t^*N_{TB}), \quad (7)$$

$$X=(u^*NACK_{CBG}+(u-1)^*NACK_{TB})/(u^*N_{CBG}+(u-1)^*N_{TB}), \quad (8)$$

where $NACK_{CBG}$ is the number of NACKs per CBG in the reference UL burst, $NACK_{TB}$ is the number of NACKs per TB in the reference UL burst, $N_{CBG}$ is the total number of CBGs feedbacks in the UL reference burst, $N_{TB}$ is the total number of TBs feedbacks in the UL reference burst. In some embodiments if eqn. (7) is used, "c" and "t" may be two variables. In another option, these two values may depend on the number of TB and/or CBG transmissions scheduled in the UL burst. In some embodiments, the value of c and/or t may be RRC configurable or depend on the configuration. In some embodiments, if eqn. (8) is used, "u" may be a variable such that 0≤u≤1. In some embodiments, the value of u may be RRC configurable or depend on the configuration In some embodiments: if a configured grant (CG)-DFI is received, and if CBG-based configuration is used, the CWS may be reset to its minimum value if all of the currently scheduled CBGs of the TB are ACK'ed. Otherwise, the CWS may be increased. Alternatively, if an UL grant is received, and CBG-based transmissions is configured, the UE may know the status of each CBG via the CBGTI. If the NDI bit is not toggled (i.e., retransmission), the UE should consider a NACK if any of the CBGTI bits is set to 1.

As in Rel-14, in some embodiments, the CWS may be reset to the minimum value if the maximum CWS is used for K consecutive LBT attempts for transmission only for the priority class for which maximum CWS is used for K consecutive LBT attempts. The value of K may be left up to the UE implementation.

For grant-free uplink transmission in NR-U, in some embodiments, if an UL grant or a DFI-DCI is received, the CWS may be reset for all the priority classes if a UL grant is received and the NDI bit for at least one of the active HARQ processes associated with HARQ_ID_ref is toggled or an DFI-DCI is received and indicates: an ACK for all the CBGs for at least one of the active HARQ processes associated with HARQ_ID_ref; an ACK for one of the CBGs for at least one of the active HARQ processes associated with HARQ_ID_ref; or an ACK for Y % of the CBGs for at least one of the active HARQ processes associated with HARQ_ID_ref.

The CWS of all priority classes at the UE may be increased to the next higher value if a UL grant is received and the NDI bit(s) of all the active HARQ processe(s) for the reference burst are not toggled, or a UL grant is received and does not schedule any active HARQ process for the reference burst or a DFI-DCI is received which: does not indicate an ACK for all the CBGs for at least one of the active HARQ processes for the reference burst; does not indicate an ACK for X % of all the CBGs for at least one of the active HARQ processes for the reference burst; or does not indicate an ACK for X % of the CBGs for at least one of the active HARQ processes associated with HARQ_ID_ref.

As for Rel-14, the CWS may be reset to the minimum value if the maximum CWS is used for K consecutive LBT attempts for transmission only for the priority class for which maximum CWS is used for K consecutive LBT attempts. As above, the value of K may be left up to the UE implementation.

In some embodiments, there may exist at least one previous Cat.4 LBT UL transmission from the start slot of which N or more slots have elapsed and neither the UL grant nor DFI-DCI has been received. As an example, N=max (X, corresponding UL burst length+1) if X>0 and N=0. In other embodiments, X may be RRC configured. In this case, for each previous Cat-4 LBT (SUL/AUL) transmission from the start slot of which N or more slots have elapsed and neither UL grant nor DFI-DCI is received, the CWS for all priority classes at the UE may be increased to the next higher value, and each such previous Cat-4 LBT transmission may be used to adjust the CWS only once.

If the UE starts a new Cat-4 LBT UL transmission before N slots have elapsed from the previous Cat-4 LBT and neither UL grant nor DFI-DCI is received, the CWS may be unchanged.

If the UE receives feedback for one or more previous Cat-4 LBT (SUL/AUL) transmissions from the start slot of which N or more slots have elapsed and neither UL grant nor DFI-DCI was received, the UE may re-compute the CWS as follows: i) the UE may revert the CWS to the value used to transmit the first burst of such previous Cat-4 LBT transmission(s); or ii) the UE may update the CWS sequentially in order of the transmission of bursts as follows.

To update the CWS sequentially, if the feedback indicates: an ACK for all the CBGs for the first slot of the burst, or an ACK for X % of all CBGs for the first slot of the burst, the CWS may be reset (either by the UE or in response to control information from the base station). Otherwise, the CWS may be doubled. If the UE CWS changes while a Cat-4 LBT procedure is ongoing, the UE may draw a new random back-off counter and applies the back-off counter to the ongoing LBT procedure.

In some embodiments, only the PUSCH for one or more of the following cases are used for the CWS adjustment: only a PUSCH whose starting symbol is within the reference burst; only a PUSCH within the reference burst; or only the earliest PUSCH within the reference burst.

In some embodiments, the TB/CBGs for one or more of the following may not be used for the CWS adjustment: a TB/CBG that is punctured by others e.g., URLLC, or if in the initial partial slot, a TB/CBG punctured due to late channel occupation.

Figure 5:
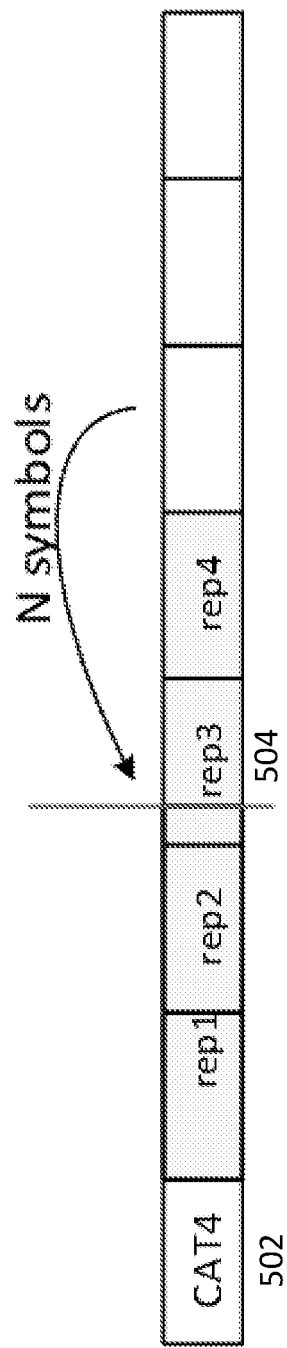
FIG. 5 illustrates a partial physical uplink shared channel (PUSCH) repetition in accordance with some embodiments.

FIG. 5 illustrates a partial PUSCH repetition in accordance with some embodiments. In some embodiments, for multi-slot PUSCH, one of the following options can be enforced to prevent the use of a partial PUSCH repetition 504 as a reference burst after a CAT4 transmission 502.

In some embodiments, the gNB implementation may guarantee that after receiving a reference timing ns-N, there will always be a PUSCH with a full repetitions. This PUSCH can be used as a reference burst.

In some embodiments, if the reference timing ns-N is in the middle of the repetitions of a TB, the UE can skip this TB, and use an even earlier PUSCH transmission as the reference burst.

In some embodiments, a threshold can be configured to decide whether a TB can be used within the reference burst. The threshold can be a number of repetitions. Let the reference timing ns-N be in the middle of the repetitions of a TB: if the number of repetitions received by the gNB is greater than the threshold, the HARQ-ACK for the TB can still be a good reference for CWS; otherwise, the UE can skip this TB, and use an earlier PUSCH transmission as the reference burst.

In some embodiments, a threshold can be used to determine the number of repetitions used by the gNB. The threshold can be a maximum coding rate. Let the reference timing ns-N is in the middle of the repetitions of a TB: if coding rate of repetitions received by the gNB is lower than the threshold, the current TB can be used within the reference burst. Otherwise, the UE can skip this TB, and use an earlier PUSCH transmission as the reference burst.

In some embodiments, regardless of the reference timing ns-N, if at least one of the repetitions follows the reference burst, all the repetitions may be used for the CWS adjustment.

In some embodiments, assuming there are multiple PUSCHs transmitted in the reference burst, if there is a multi-slot PUSCH in the reference burst, but only part of the repetitions is received by the gNB, only other PUSCHs may be considered in the CWS adjustment.

EXAMPLES

Example 1 is an apparatus of a user equipment (UE), the apparatus comprising: processing circuitry configured to: decode a reference burst transmitted from a base station in an unlicensed spectrum; determine a Hybrid Automatic Repeat Request Acknowledgment (HARQ-ACK) determination for at least one code block group (CBG) of a transport block (TB) in the reference burst, the TB comprising a plurality of CBGs; determine whether the HARQ-ACK determination for the at least one CBG meets a predetermined number of negative ACKs (NACKs); encode, for transmission to the base station, HARQ-ACK feedback for the TB instead of for each of CBGs if the HARQ-ACK feedback is a single bit, the HARQ-ACK feedback dependent on whether the predetermined number has been met; and use an adjusted contention window (CW) size for a listen-before-talk (LBT) procedure for uplink communications with the base station in the unlicensed spectrum, the adjusted CW size based on the HARQ-ACK feedback; and a memory configured to store the adjusted CW size.

In Example 2, the subject matter of Example 1 includes, wherein: the reference burst is a predetermined time that starts from a beginning of a downlink burst containing the reference burst, and the predetermined time is independent of subcarrier spacing.

In Example 3, the subject matter of Examples 1-2 includes, wherein: the reference burst starts from a beginning of a downlink burst containing the reference burst, the reference burst is a combination of a partial subframe or slot in addition to a subframe or slot immediately after the partial subframe or slot, and the reference burst is independent of subcarrier spacing.

In Example 4, the subject matter of Examples 1-3 includes, wherein: the reference burst is N symbols that start from a beginning of a downlink burst containing the reference burst, and N is configured by radio resource control (RRC) signaling from the base station.

In Example 5, the subject matter of Example 4 includes, wherein: if the downlink burst comprises a partial slot that starts from the beginning of the downlink burst, N is able to be larger than a number of symbols in the partial slot.

In Example 6, the subject matter of Examples 1-5 includes, wherein: the reference burst starts from a beginning of a downlink burst containing the reference burst, and the reference burst is limited to a partial slot that starts from the beginning of the downlink burst.

In Example 7, the subject matter of Examples 1-6 includes, wherein: if the HARQ-ACK determination of at least one CBG of the TB is a NACK, the HARQ-ACK determination of all of the CBGs of the TB are determined to be NACKs.

In Example 8, the subject matter of Examples 1-7 includes, wherein: the HARQ-ACK determination of each CBG of the TB is determined to be an ACK or a NACK independent of the HARQ-ACK determination of other CBGs of the TB.

In Example 9, the subject matter of Examples 1-8 includes, wherein: the HARQ-ACK feedback for the TB is a NACK if the HARQ-ACK determination of at least one CBG of the TB is a NACK.

In Example 10, the subject matter of Examples 1-9 includes, wherein: the HARQ-ACK feedback for the TB is a NACK if the HARQ-ACK determination of each CBG of the TB is a NACK.

In Example 11, the subject matter of Examples 1-10 includes, wherein: the HARQ-ACK feedback for the TB is a NACK if a set percentage of the HARQ-ACK determination of the CBGs of the TB is a NACK.

In Example 12, the subject matter of Examples 1-11 includes, wherein: the reference burst is a predetermined time that starts from a beginning of a downlink burst containing the reference burst, and the predetermined time is independent of subcarrier spacing.

In Example 13, the subject matter of Examples 1-12 includes, wherein the processing circuitry is further configured to: encode for transmission to the base station a reference uplink burst to be used by the base station to determine the CW size adjustment.

In Example 14, the subject matter of Example 13 includes, wherein the processing circuitry is further configured to: decode, from the base station, a number of symbols that is dependent on base station processing delay and a margin for scheduling by the base station and processing time of the UE, and encode the reference uplink burst the number of symbols before a CORESET, the CORESET related to the reference uplink burst and containing one of an uplink grant or a downlink Feedback Indication (DFI) downlink control information (DCI).

In Example 15, the subject matter of Example 14 includes, wherein the processing circuitry is further configured to: encode the reference uplink burst the number of symbols before the CORESET, the number of symbols further dependent on a timing advance of the UE.

In Example 16, the subject matter of Examples 1-15 includes, wherein: the processing circuitry is further configured to reset the CW size, independent of a priority class of the UE, if the UE is scheduled and a New Data Indicator (NDI) bit for at least one active HARQ process of a HARQ process identification associated with the reference burst is toggled, and the CW size is increased to a next higher size, independent of a priority class of the UE, if: the UE is unscheduled, or the UE is scheduled and a New Data Indicator (NDI) bit for no active HARQ process of a HARQ process identification associated with the reference burst is toggled.

Example 17 is an apparatus of a base station, the apparatus comprising: processing circuitry configured to: encode a reference burst for transmission in an unlicensed spectrum, the reference burst comprising a transport block (TB) segmented into code block groups (CBGs); decode, from a user equipment (UE), Hybrid Automatic Repeat Request Acknowledgment (HARQ-ACK) feedback for the TB instead of for the CBGs if the HARQ-ACK feedback is a single bit; determine an adjusted contention window (CW) size for a listen-before-talk (LBT) procedure for uplink communications in the unlicensed spectrum, the adjusted CW size based on the HARQ-ACK feedback, whether a maximum channel occupancy time (MCOT) associated with the reference burst is shared with grant-free or scheduled UEs, a priority class of the UE, whether at least one of the TB or at least one CBG is punctured, whether the base station is to send a physical downlink shared channel (PDSCH) transmission during the MCOT, and whether the UE is using discontinuous transmission; and encode, for transmission to the UE, the adjusted CW size; and a memory configured to store the adjusted CW size.

In Example 18, the subject matter of Example 17 includes, wherein: if the base station does not send any PDSCH transmissions and part of the MCOT is configured for uplink transmissions with overlapping time-domain resources, the base station is configured to at least one of: increase the CW size if less than a predetermined percent of one of scheduled uplink TBs or CBGs are not successfully received, or if the base station shares the MCOT with grant-free UEs, adjust the CW size based on at least one of: the one of scheduled uplink TBs or CBGs, or one of grant-free TBs or CBGs, that have been detected by the base station.

Example 19 is a non-transitory computer-readable storage medium that stores instructions for execution by one or more processors of a user equipment (UE), the one or more processors to configure the UE to, when the instructions are executed: determine a Hybrid Automatic Repeat Request Acknowledgment (HARQ-ACK) determination for at least one code block group (CBG) of a transport block (TB) in a reference burst received from a base station in an unlicensed spectrum, the TB comprising a plurality of CBGs; determine whether the HARQ-ACK determination for the at least one CBG meets a predetermined number of negative ACKs (NACKs); transmit to the base station HARQ-ACK feedback for the TB instead of for the plurality of CBGs if the HARQ-ACK feedback is a single bit, the HARQ-ACK feedback dependent on whether the predetermined number of NACKs is determined to have been met; receive an adjusted contention window (CW) size based on the HARQ-ACK feedback; and use the adjusted CW size for a listen-before-talk (LBT) procedure for uplink communications with the base station in the unlicensed spectrum.

In Example 20, the subject matter of Example 19 includes, wherein: the HARQ-ACK feedback for the TB is a NACK if a set percentage of the HARQ-ACK determination of the CBGs of the TB is a NACK.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus comprising:
   at least one processor configured to cause a user equipment (UE) to:
   transmit one or more physical uplink shared channel (PUSCH) transmissions to a base station in an unlicensed spectrum in a reference burst, wherein the one or more PUSCH transmissions include transport blocks (TBs) comprised of a plurality of code block groups (CBGs);
   determine Hybrid Automatic Repeat Request Acknowledgment (HARQ-ACK) information for the plurality of CBGs in the reference burst, wherein determining incudes counting negative ACKs (NACKs) or ACKs from each CBG of the plurality of CBGs individually for each of the transport blocks, and when an uplink grant does not indicate a toggled new data indicator (NI) for a HARQ process, a value of "1" in a code block group transmit information corresponds to a NACK;
   determine whether the HARQ-ACK information for the at least one CBG meets a predetermined number of NACKs;
   use an adjusted contention window (CW) size for a listen-before talk (LBT) procedure for uplink communications with the base station in the unlicensed spectrum, the adjusted CW size based on the HARQ-ACK information.

2. The apparatus of claim 1, wherein:
   the reference burst is a predetermined time that starts from a beginning of an uplink burst containing the reference burst, and
   the predetermined time is independent of subcarrier spacing.

3. The apparatus of claim 1, wherein:
   the reference burst starts from a beginning of an uplink burst containing the reference burst, and
   the reference burst is independent of subcarrier spacing.

4. The apparatus of claim 1, wherein the CWS is reset to the minimum value when the maximum CWS is used for K consecutive LBT attempts for transmission only for the priority class for which maximum CWS is used for K consecutive LBT attempts, where K is selected by UE.

5. The apparatus of claim 1, wherein PUSCH transmissions used for CWS adjustment includes only a set of PUSCHs within the reference burst.

6. The apparatus of claim 1, wherein PUSCH transmissions used for CWS adjustment includes only a set of PUSCHs with a starting symbol in the within the reference burst.

7. The apparatus of claim 1, wherein PUSCH transmissions used for CWS adjustment includes only the earliest PUSCH in the reference burst.

8. A user equipment (UE), comprising:
   wireless communication circuitry;
   at least one processor; and
   at least one memory medium storing program instructions executable by the at least one processor to cause the UE to:
   transmit one or more physical uplink shared channel (PUSCH) transmissions to a base station in an unlicensed spectrum in a reference burst, wherein the one or more PUSCH transmissions include transport blocks (TBs) comprised of a plurality of code block groups (CBGs);
   determine Hybrid Automatic Repeat Request Acknowledgment (HARQ-ACK) information for the plurality of CBGs in the reference burst, wherein determining incudes counting negative ACKs (NACKs) or ACKs from each CBG of the plurality of CBGs individually for each of the transport blocks, and when an uplink grant does not indicate a toggled new data indicator (NI) for a HARQ process, a value of "1" in a code block group transmit information corresponds to a NACK;

determine whether the HARQ-ACK information for the at least one CBG meets a predetermined number of NACKs; and use an adjusted contention window (CW) size for a listen-before talk (LBT) procedure for uplink communications with the base station in the unlicensed spectrum, the adjusted CW size based on the HARQ-ACK information.

9. The UE of claim 8, wherein:
the reference burst is a predetermined time that starts from a beginning of an uplink burst containing the reference burst, and
the predetermined time is independent of subcarrier spacing.

10. The UE of claim 8, wherein:
the reference burst starts from a beginning of an uplink burst containing the reference burst, and
the reference burst is independent of subcarrier spacing.

11. The UE of claim 8, wherein the CWS is reset to the minimum value when the maximum CWS is used for K consecutive LBT attempts for transmission only for the priority class for which maximum CWS is used for K consecutive LBT attempts, where K is selected by UE.

12. The UE of claim 8, wherein PUSCH transmissions used for CWS adjustment includes only a set of PUSCHs within the reference burst.

13. The UE of claim 8, wherein PUSCH transmissions used for CWS adjustment includes only a set of PUSCHs with a starting symbol in the within the reference burst.

14. The UE of claim 8, wherein PUSCH transmissions used for CWS adjustment includes only the earliest PUSCH in the reference burst.

15. A non-transitory, computer accessible memory medium storing program instructions executable by at least one processor of a user equipment (UE) to cause the UE to:
transmit one or more physical uplink shared channel (PUSCH) transmissions to a base station in an unlicensed spectrum in a reference burst, wherein the one or more PUSCH transmissions include transport blocks (TBs) comprised of a plurality of code block groups (CBGs);

determine Hybrid Automatic Repeat Request Acknowledgment (HARQ-ACK) information for the plurality of CBGs in the reference burst, wherein determining incudes counting negative ACKs (NACKs) or ACKs from each CBG of the plurality of CBGs individually for each of the transport blocks, and when an uplink grant does not indicate a toggled new data indicator (NI) for a HARQ process, a value of "1" in a code block group transmit information corresponds to a NACK;

determine whether the HARQ-ACK information for the at least one CBG meets a predetermined number of NACKs; and use an adjusted contention window (CW) size for a listen-before talk (LBT) procedure for uplink communications with the base station in the unlicensed spectrum, the adjusted CW size based on the HARQ-ACK information.

16. The non-transitory, computer accessible memory medium of claim 15, wherein:
the reference burst is a predetermined time that starts from a beginning of an uplink burst containing the reference burst, and
the predetermined time is independent of subcarrier spacing.

17. The non-transitory, computer accessible memory medium of claim 15, wherein:
the reference burst starts from a beginning of an uplink burst containing the reference burst, and
the reference burst is independent of subcarrier spacing.

18. The non-transitory, computer accessible memory medium of claim 15, wherein the CWS is reset to the minimum value when the maximum CWS is used for K consecutive LBT attempts for transmission only for the priority class for which maximum CWS is used for K consecutive LBT attempts, where K is selected by UE.

19. The non-transitory, computer accessible memory medium of claim 15, wherein PUSCH transmissions used for CWS adjustment includes only a set of PUSCHs within the reference burst.

20. The non-transitory, computer accessible memory medium of claim 15, wherein PUSCH transmissions used for CWS adjustment includes only a set of PUSCHs with a starting symbol in the within the reference burst.

* * * * *